US007760273B2

(12) United States Patent
Park et al.

(10) Patent No.: US 7,760,273 B2
(45) Date of Patent: Jul. 20, 2010

(54) IMAGE PROCESSING APPARATUS AND IMAGE PROCESSING METHOD

(75) Inventors: Han-jin Park, Suwon-si (KR); Ik-song Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1040 days.

(21) Appl. No.: 11/445,266

(22) Filed: Jun. 2, 2006

(65) Prior Publication Data

US 2007/0040776 A1 Feb. 22, 2007

(30) Foreign Application Priority Data

Aug. 18, 2005 (KR) ...................... 10-2005-0075889

(51) Int. Cl.
*H04N 5/74* (2006.01)
*H04N 9/12* (2006.01)

(52) U.S. Cl. ....................................... 348/781; 348/739

(58) Field of Classification Search ................. 348/743, 348/781, 687, 739, 740, 744, 742; 353/85, 353/88, 97, 29–31, 69; 345/84, 102, 108, 345/109; *H04N 5/74, 9/12, 3/12, 5/64, 9/31, H04N 5/57*

See application file for complete search history.

(56) References Cited

U.S. PATENT DOCUMENTS 7,034,801 B2 * 4/2006 Sato et al. ................... 348/742
7,093,941 B2 * 8/2006 Kawashima et al. ......... 348/790

FOREIGN PATENT DOCUMENTS

| | | | |
|---|---|---|---|
| JP | 07-140434 | A | 6/1995 |
| JP | 2001-174910 | A | 6/2001 |
| JP | 2002-148712 | A | 5/2002 |
| KR | 10-2003-0031296 | A | 4/2003 |

* cited by examiner

*Primary Examiner*—Sherrie Hsia
(74) *Attorney, Agent, or Firm*—Sughrue Mion, PLLC

(57) ABSTRACT

An image processing apparatus including a displaying part, a light source generating light and a display driving part displaying an image on the displaying part by controlling the intensity of the light generated by the light source on the basis of one of a plurality of image signals. A light shutting part passes or shuts out the light generated by the light source; and a controlling part controls the light shutting part to shut the light generated by the light source while the image signal which has been displayed on the displaying part is being changed into other one of the plurality of image signals. Thus, the present invention provides an image processing apparatus and an image processing method to prevent a transitional phenomenon from occurring when an image is changed.

9 Claims, 6 Drawing Sheets

--PRIOR ART--

IMAGE PROCESSING APPARATUS AND IMAGE PROCESSING METHOD

CROSS-REFERENCE TO RELATED APPLICATIONS

This application claims priority from Korean Patent Application No. 2005-0075889, filed on Aug. 18, 2005, in the Korean Intellectual Property Office, the disclosure of which is incorporated herein by reference.

BACKGROUND OF THE INVENTION

1. Field of the Invention

The present invention relates to an image processing apparatus and an image processing method and, more particularly, to an image processing apparatus and an image processing method to prevent a transitional phenomenon from occurring when an image is changed.

2. Description of the Related Art

An image processing apparatus, such as a TV, receives an image signal containing a predetermined signal in the form of an air wave TV broadcast, a cable TV broadcast etc., from broadcast stations, or receives an image signal inputted by various video apparatus such as a VCR or a DVD player and performs image processing on the image signal to display image. The image processing apparatus may comprise a light source generating light to display the image. The image processing apparatus having the light source may include a projection TV, LCD TV, etc.

FIG. 1 is a block diagram schematically showing the composition of a conventional image processing apparatus comprising a light source. The image processing apparatus 1 may be a DLP (digital light processing) type projection TV, and comprises a light source 11, a displaying part 12, an image processing part 13, a display driving part 14 and a controlling part 15. The light source 11 generates light for an image display. The displaying part 12 may be a screen which displays an image. The image processing part 13 performs predetermined image processing including analog-to-digital conversion, decoding, etc. on the image signal received from the broadcasting station or the video apparatus.

The display driving part 14 comprises a DMD (digital micromirror device) having an array of a plurality of micromirrors, and drives each micromirror on the basis of the image signal. The display driving part 14 adjusts the intensity of the light generated by the light source 11 to display an image on the displaying part 12. The controlling part 15 performs the overall control of the image processing apparatus 1, and controls the image processing part 13 and the display driving part 14 to display the image according to a channel or a source which is chosen by a user.

According to the image processing apparatus 1, if the channel or the source which has been displayed is changed into another channel or source, the image which is being changed is controlled not to be displayed. For example, if there is an order from the user that the channel or the source should be changed, the image processing apparatus 1 transmits a video mute signal not to display any image to the display driving part 14, and controls the image processing part 13 to convert to the channel or the source which is chosen by the user. If the image processing apparatus 1 determines that the channel has been changed by checking the image processing part 13, it transmits a video mute cancellation signal to the display driving part 14, so that the image from the changed channel or source may be displayed on the displaying part 12.

However, according the conventional image processing apparatus 1, if there is not synchronization between the time when the video mute is performed and the time when the channel or the source is changed by a predetermined cause, an unstable image may be displayed on the displaying part 12. That is, when the video mute is cancelled even though the change of the channel or the source has not been completed, the changing image between channels or sources is displayed, so that broken image may be shown by a transitional phenomenon.

SUMMARY OF THE INVENTION

Accordingly, it is an aspect of the present invention to provide an image processing apparatus and an image processing method to prevent a transitional phenomenon from occurring when image is changed.

Additional aspects and/or advantages of the present invention will be set forth in part in the description which follows and, in part, will be obvious from the description, or may be learned by practice of the present invention.

The foregoing and/or other aspects of the present invention are also achieved by providing an image processing apparatus comprising a displaying part; a light source generating light; a display driving part displaying an image on the displaying part by controlling the intensity of the light generated by the light source on the basis of one of a plurality of image signals; a light shutting part passing or blocking the light generated by the light source; and a controlling part controlling the light shutting part to block the light generated by the light source while the image signal which has been displayed on the displaying part is being changed into other one of the plurality of image signals.

According to another aspect of the present invention, the light shutting part comprises a light shutting plate disposed to rotate across a path of the light and passing or blocking the light generated by the light source, and a motor rotating the light shutting plate according to the control of the controlling part.

According to another aspect of the present invention, the controlling part controls the display driving part so that the image may is not displayed on the displaying part while the image signal is being changed.

According to another aspect of the present invention, the controlling part controls the light shutting part to adjust the degree in blocking the light generated by the light source according to the state of the image signal which is being changed.

The foregoing and/or other aspects of the present invention are also achieved by providing an image processing method of an image processing apparatus having a displaying part, a light source generating light and a display driving part displaying an image on the displaying part by controlling the intensity of the light generated by the light source on the basis of one of a plurality of image signals, the image processing method comprising blocking the light generated by the light source when there is a user's order that the image signal which is being displayed is changed into other one of the plurality of image signals; changing the image signal after the light generated by the light source is blocked; and passing the light generated by the light source if the image signal is recognized to have been changed.

According to another aspect of the present invention, the image processing method further comprises controlling the display driving part so that the image is not displayed on the displaying part while the image signal is being changed.

According to another aspect of the present invention, the image processing method further comprises adjusting the degree of blocking the light generated by the light source according to the state of the image signal which is being changed.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF ILLUSTRATIVE, NON-LIMITING, EMBODIMENTS OF THE INVENTION

Figure 1:
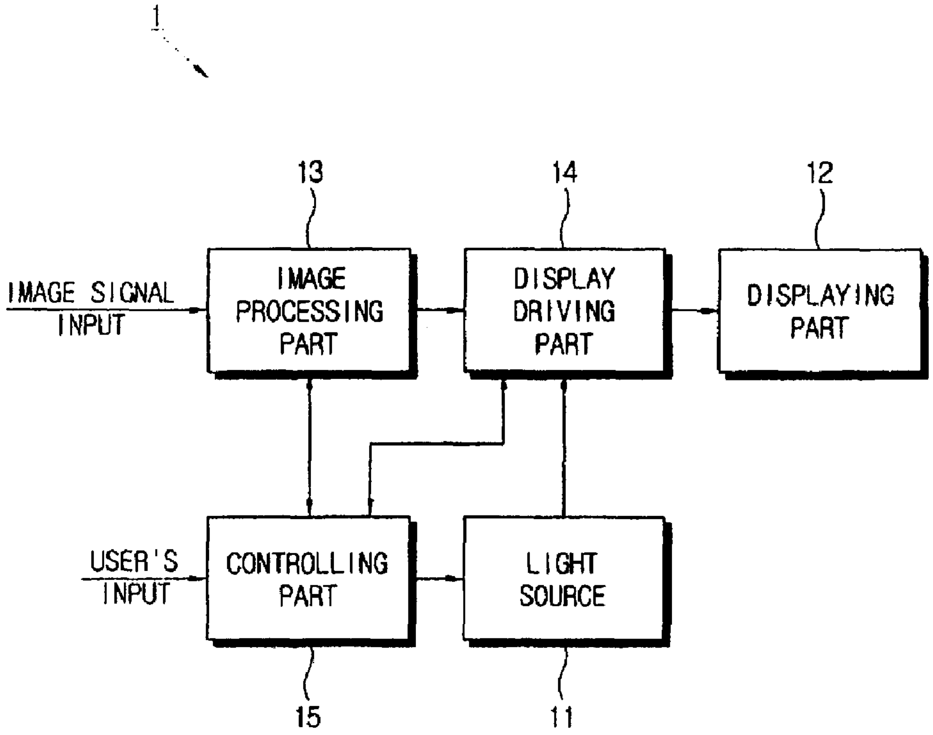
FIG. 1 is a block diagram schematically showing the conventional image processing apparatus comprising a light source.

Reference will now be made in detail to the exemplary embodiments of the present invention, examples of which are illustrated in the accompanying drawings, wherein like reference numerals refer to like elements throughout. The described exemplary embodiments are intended to assist the understanding of the invention, and are not intended to limit the scope of the invention in any way.

Figure 2:
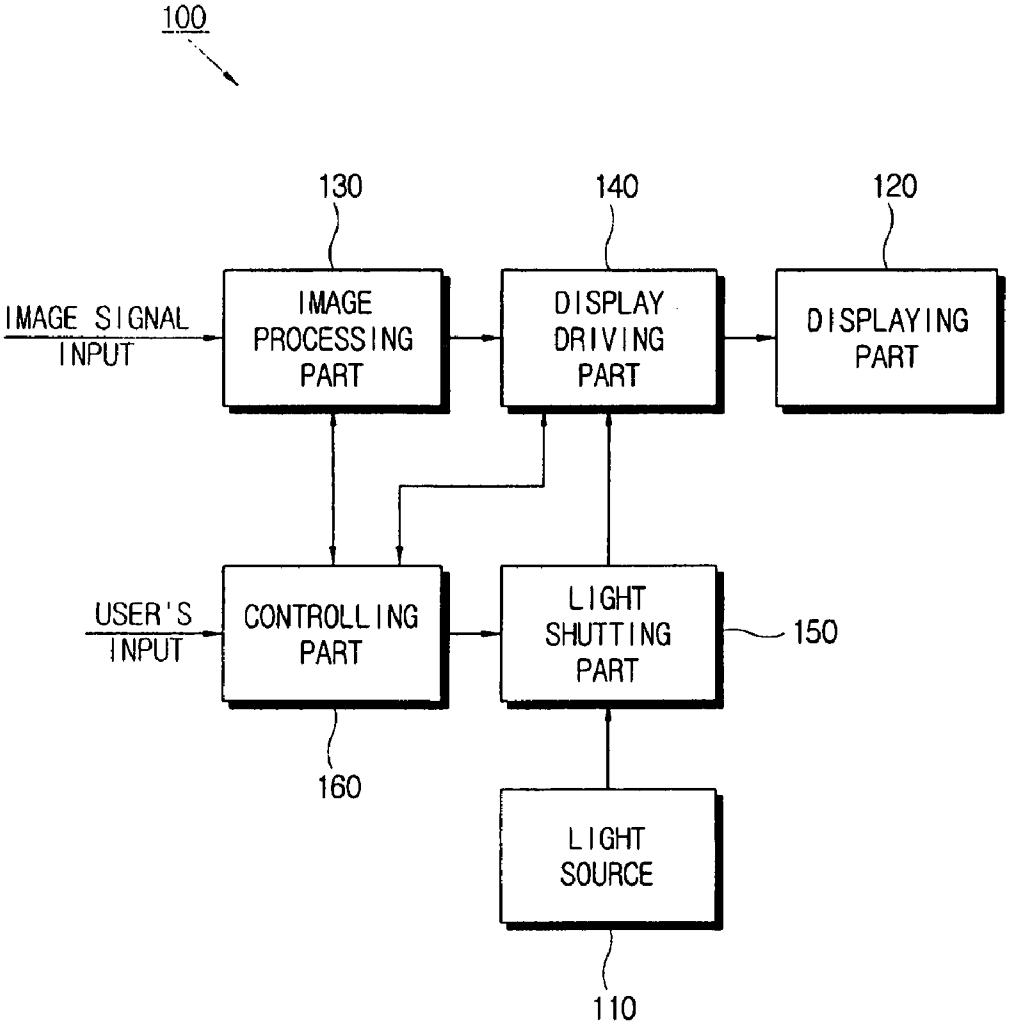
FIG. 2 is a block diagram schematically showing an image processing apparatus according to an exemplary embodiment of the present invention.

FIG. 2 is a block diagram schematically showing the image processing apparatus 100 according to the exemplary embodiment of the present invention. The image processing apparatus 100 receives an image signal containing a predetermined signal in the form of an air wave TV broadcast, a cable TV broadcast etc., from broadcasting stations, or receives an image signal inputted by various video apparatus such as a VCR or a DVD player and performs image processing on the image signal to display an image. When the channel or the source is changed, the image processing apparatus 100 shuts the light generated for an image display to prevent the transitional phenomenon. The image processing apparatus 100 may be, for example, a projection TV.

As shown in FIG. 2, the image processing apparatus 100 comprises a light source 110, a displaying part 120, an image processing part 130, a display driving part 140, a light shutting part 150 and a controlling part 160. The light source 110 generates light for image display, and may be a lamp. The displaying part 120 is a part to display image, and may be a screen.

The image processing part 130 receives image signals from a plurality of channels or an outer video apparatus as an image source, and performs predetermined image processing such as analog-to-digital conversion and/or decoding of the image signal. Also, when there is an order by the user to change the channels or sources, the controlling part 160 controls the image processing part 130 to perform operations to convert to a chosen channel or source. For example, the image processing part 130 performs tuning to the newly chosen channel or establishing data corresponding to the newly chosen source.

The display driving part 140 comprises a DMD (digital micromirror device) which has an array of a plurality of micromirrors to reflect the light generated by the light source 110 and project the light on the screen of the displaying part 120. Also, the display driving part 140 controls each micromirror to switch on the basis of the image signal processed by the image processing part 130, and adjusts the intensity of the light generated by the light source 110 to display the image on the displaying part 120.

Figure 3:
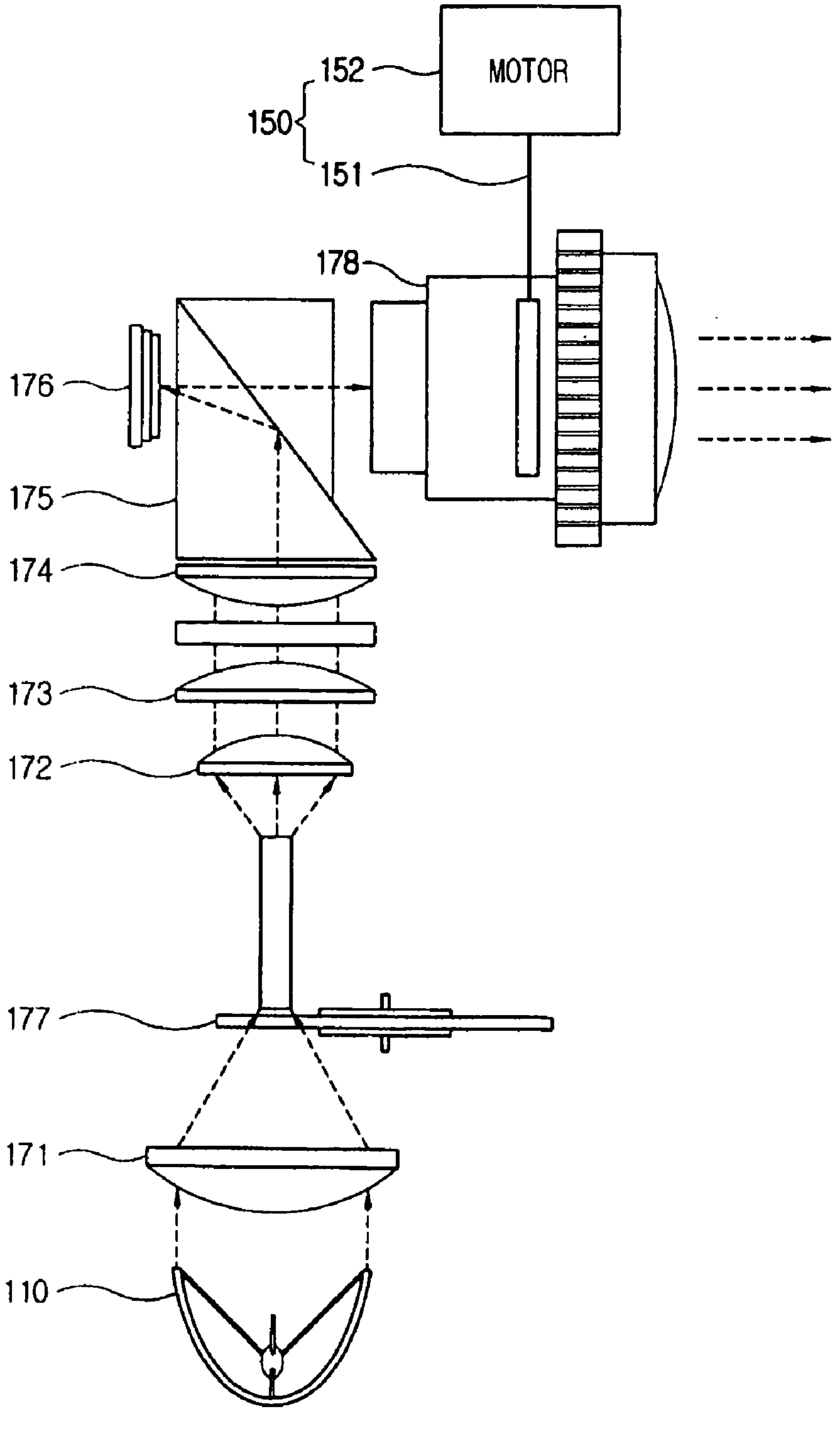
FIG. 3 is a side view of a light source and a light shutting part according to the exemplary embodiment of the present invention.

The light shutting part 150 passes or shuts the light generated by the light source 110 according to the control of the controlling part 160. FIG. 3 is a side view of the light source 110 and the light shutting part 150 of the image processing apparatus 100 according to this embodiment of the present invention. The image processing apparatus 100 may further comprise a plurality of lenses 171, 172, 173, 174 and 178, a prism 175, a reflecting mirror 176 as an optical system to make the light generated by the light source 110 properly reach the displaying part 120, and a color wheel 177 rotatably disposed to generate light according to each color of RGB.

Figure 4:
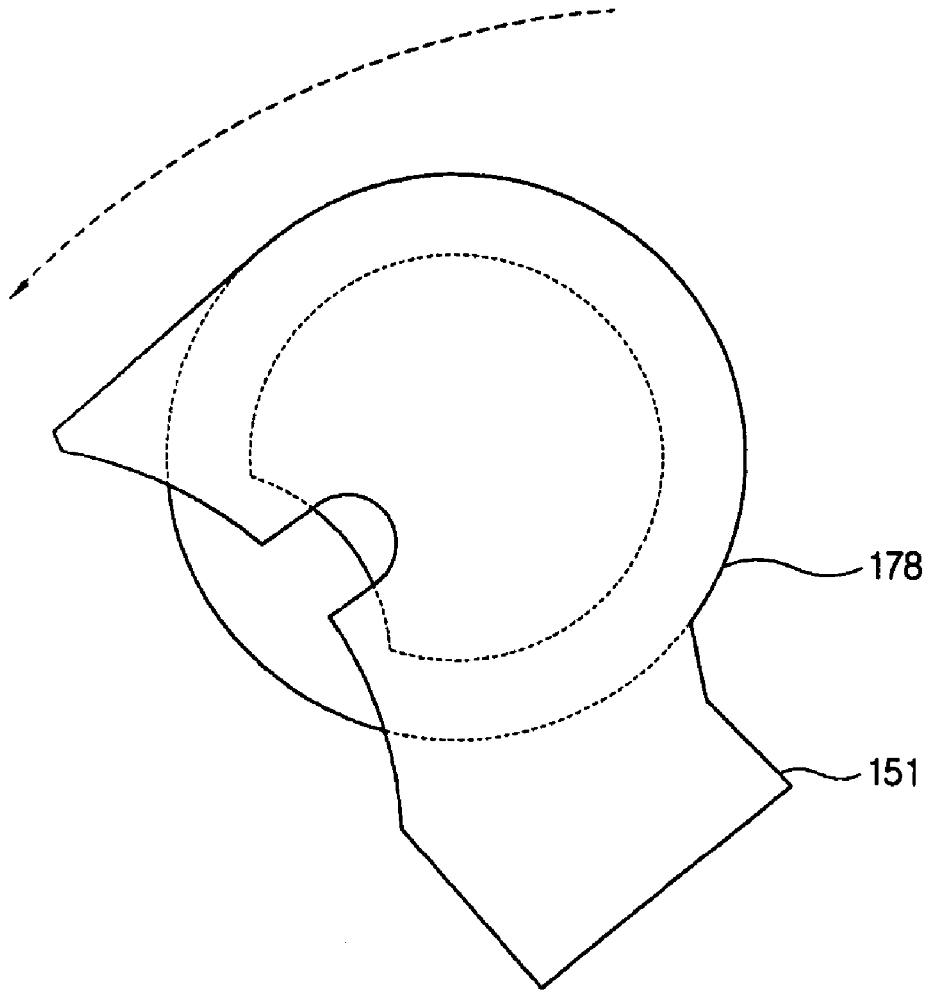
FIGS. 4 and 5 show the state when a lens is covered by a light shutting film to shut the light, and the state when the lens is uncovered by the light shutting film to pass the light.
Figure 5:
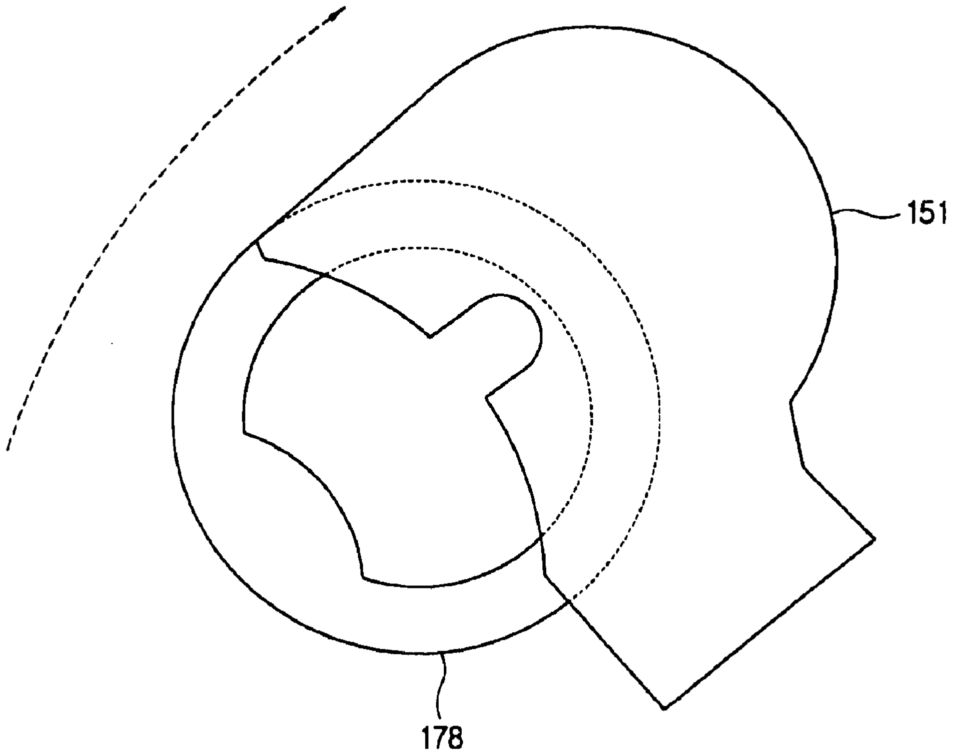

The light shutting part 150, as shown in FIG. 3, comprises a light shutting film 151 and a motor 152. The light shutting film 151 is plate-shaped, is made of non-light-transmitting material and is disposed to rotate across the path of the light generated by the light source 110. FIGS. 4 and 5 show a state when the lens 178 is covered by the light shutting film 151 to shut the light (hereinafter the state is also called "DA (dynamic aperture) OFF"), and the state when the lens 178 is uncovered by the light shutting film 151 to pass the light (hereinafter the state is called "DA ON"), respectively. An end part of the light shutting film 151 is fixed to the motor 152 which is controlled by the controlling part 160, so that it is rotated to pass or shut the light generated by the light source 110.

The controlling part 160 performs the overall control of the image processing apparatus 100, and controls the image processing part 130 and the display driving part 140 so that the image of the channel or the source chosen by the user may be displayed. When the channel or the source is changed by the user's order, the controlling part 160 controls the light shutting part 150 in order not to display the image which is being changed, so that a transitional phenomenon, which displays an unstable image based on the change of the channel or the source, may be prevented. The controlling part 160 controls the light shutting part 150 to shut the light generated by the light source 110 during a time when the channel or the source is changed.

To effectively prevent the transitional phenomenon, the controlling part 160 may control the display driving part 130 not to display the image on the displaying part 120 while the channel or the source is changed. Also, the controlling part 160 may control the degree of shutting the light generated by the light source 110 according to the state of the changing image signal. That is, the controlling part 160 previously estimates the degree of the transitional phenomenon which corresponds to the state where the channel or the source is changed, and adjusts the degree of shutting the lens 178 by the light shutting film 151, so that the degree of shutting the light generated by the light source 110 may be adjustable.

The controlling part 160 according to this exemplary embodiment may be embodied as a predetermined computer program which is executed by a microprocessor such as a CPU. In this case, the computer program may be programmed to properly function and saved in a flash memory.

Figure 6:
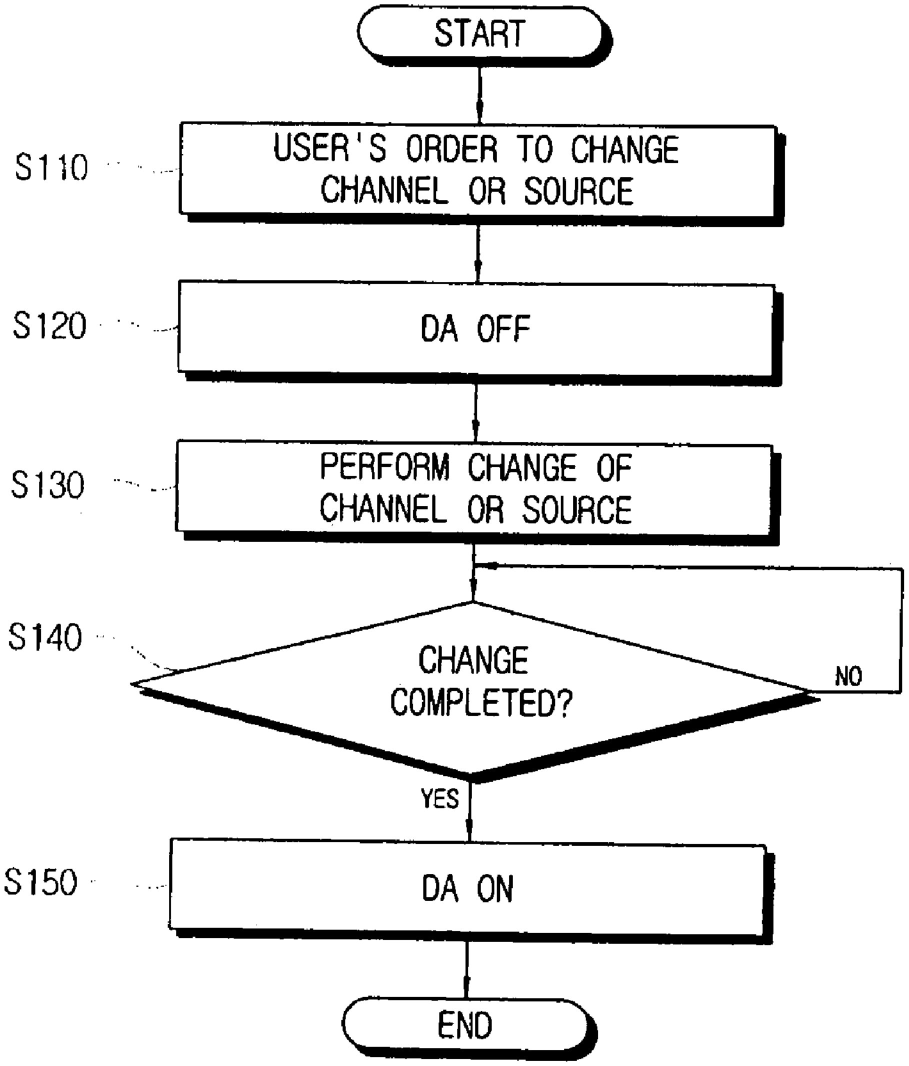
FIG. 6 is a flow diagram schematically showing the operation of the image processing apparatus according to the exemplary embodiment of the present invention.

FIG. 6 is a flow diagram schematically showing the operation of the image processing apparatus 100 according to this exemplary embodiment. When there is a user's order to change the channel or the source which the user has been watching at S110, the image processing apparatus 100 controls the light shutting part 150 to shut the light generated by the light source 110 which is the DA OFF state at S120. When the light generated by the light source 110 is shut, the image processing apparatus 100 controls the image processing part 130 to perform the operation of changing the channel or the source at S130. Then, the image processing apparatus 100 confirms whether the change of the channel or the source has been completed or not at S140. If the image processing apparatus 100 determines that the change of the channel or the source is completed, it controls the light shutting part 150 so that the light generated by the light source 110 may be passed to display the image, i.e. the DA ON state at S150.

In another exemplary embodiment, the image processing apparatus 100 may control the display driving part 130 in order not to display the changing image on the displaying part 120 while the channel or the source is changed. In this case, the image processing apparatus 100 may control the display driving part 140 to perform video mute in which the image is not displayed after the DA OFF state is reached by the light shutting part 150. Also, if the image processing apparatus 100 determines that the change of the channel or the source is completed, it may control the display driving part 140 to cancel the video mute so that the image is displayed again. The display driving part 140 may turn on and off each micromirror of the DMD to perform the video mute and the cancel of the video mute.

Although a few exemplary embodiments of the present invention have been shown and described, it will be appreciated by those skilled in the art that changes may be made in these embodiments without departing from the principles and spirit of the invention, the scope of which is defined in the appended claims and their equivalents. For example, the image processing apparatus according to the present invention may include various video apparatus, for example, a video apparatus which includes a light source to display the image, such as a projection TV, an LCD TV, etc.

What is claimed is:

1. An image processing apparatus comprising:

a displaying part;

a light source generating light;

a display driving part displaying an image on the displaying part by controlling an intensity of the light generated by the light source on the basis of one of a plurality of image signals;

a light shutting part passing or blocking the light generated by the light source; and a controlling part controlling the light shutting part to block the light generated by the light source while the image signal which has been displayed on the displaying part is being changed into another one of the plurality of image signals.

2. The image processing apparatus according to claim 1, wherein the light shutting part comprises:

a light shutting plate disposed to rotate across a path of the light and passing or blocking the light generated by the light source, and a motor rotating the light shutting plate according to the control of the controlling part.

3. The image processing apparatus according to claim 1, wherein the controlling part controls the display driving part so that the image is not displayed on the displaying part while the image signal is being changed.

4. The image processing apparatus according to claim 1, wherein the controlling part controls the light shutting part to adjust the degree of blocking the light generated by the light source according to the state of the image signal which is being changed.

5. The image processing apparatus according to claim 4, wherein the controlling part estimates the degree of a transitional phenomenon which corresponds to the state of the image signal being changed and controls the light shutting part to adjust the degree of blocking the light according to the estimated degree of the transitional phenomenon estimated.

6. An image processing method of an image processing apparatus having a displaying part, a light source generating light and a display driving part displaying an image on the displaying part by controlling intensity of the light generated by the light source on the basis of one of a plurality of image signals, the image processing method comprising:

blocking the light generated by the light source when there is a user's order that the image signal which is being displayed is changed into another one of the plurality of image signals;

changing the image signal after the light generated by the light source is shut; and passing the light generated by the light source if the image signal is recognized to have been changed.

7. The image processing method according to claim 6 further comprising controlling the display driving part so that the image is not displayed on the displaying part while the image signal is being changed.

8. The image processing method according to claim 6 further comprising adjusting the degree of blocking the light generated by the light source according to the state of the image signal which is being changed.

9. The image processing method according to claim 8, further comprising estimating the degree of a transitional phenomenon which corresponds to the state of the image signal being changed; and wherein the adjusting the degree of blocking is based on the estimated degree of the transitional phenonmenon.

* * * * *